United States Patent
Zanter et al.

(10) Patent No.: US 6,185,938 B1
(45) Date of Patent: Feb. 13, 2001

(54) TURBO-CHARGED INTERNAL COMBUSTION ENGINE

(75) Inventors: Lennarth Zander, Mölndal; Lars Nilsson, Kungsbacka; Patrick Olsson, Gothenburg; Fredrik Wemmert, Torslanda; Johan Tollmen, Axvall, all of (SE)

(73) Assignee: AB Volvo, Gothenburg (SE)

( * ) Notice: Under 35 U.S.C. 154(b), the term of this patent shall be extended for 0 days.

(21) Appl. No.: 09/331,214

(22) PCT Filed: Dec. 16, 1997

(86) PCT No.: PCT/SE97/02108

§ 371 Date: Nov. 16, 1999

§ 102(e) Date: Nov. 16, 1999

(87) PCT Pub. No.: WO98/29646

PCT Pub. Date: Jul. 9, 1998

(30) Foreign Application Priority Data

Dec. 17, 1996 (SE) .................................................... 9604639

(51) Int. Cl.[7] .................................................... F02B 37/00
(52) U.S. Cl. ................................ 60/597; 60/280; 60/605.1
(58) Field of Search .............................. 60/280, 597, 598, 60/602, 605.1

(56) References Cited

U.S. PATENT DOCUMENTS

| 3,469,393 | 9/1969 | Tryhorn . |
| 4,207,742 | 6/1980 | Dommes et al. . |
| 4,249,382 | 2/1981 | Evans et al. . |
| 4,270,356 | 6/1981 | Will et al. . |
| 4,406,126 | 9/1983 | Yokokura et al. . |

FOREIGN PATENT DOCUMENTS

| 3312093 | * 10/1984 | (DE) | ....................................... 60/602 |
| 2483515 | * 12/1981 | (FR) | ....................................... 60/602 |
| 57-93615 | * 6/1982 | (JP) | ....................................... 60/602 |

* cited by examiner

Primary Examiner—Michael Koczo
(74) Attorney, Agent, or Firm—Young & Thompson

(57) ABSTRACT

A five-cylinder turbocharged internal combustion engine has an exhaust manifold (6–10) connected to a turbine housing (13). Four exhaust manifold conduits (7, 8, 9, 10) lead in pairs to the inlets (11, 12) of a twin-entry turbine (14). The fifth exhaust manifold conduit (6) is drawn past the turbine housing and opens into an exhaust pipe (18) on the downstream side of the turbine housing.

8 Claims, 1 Drawing Sheet

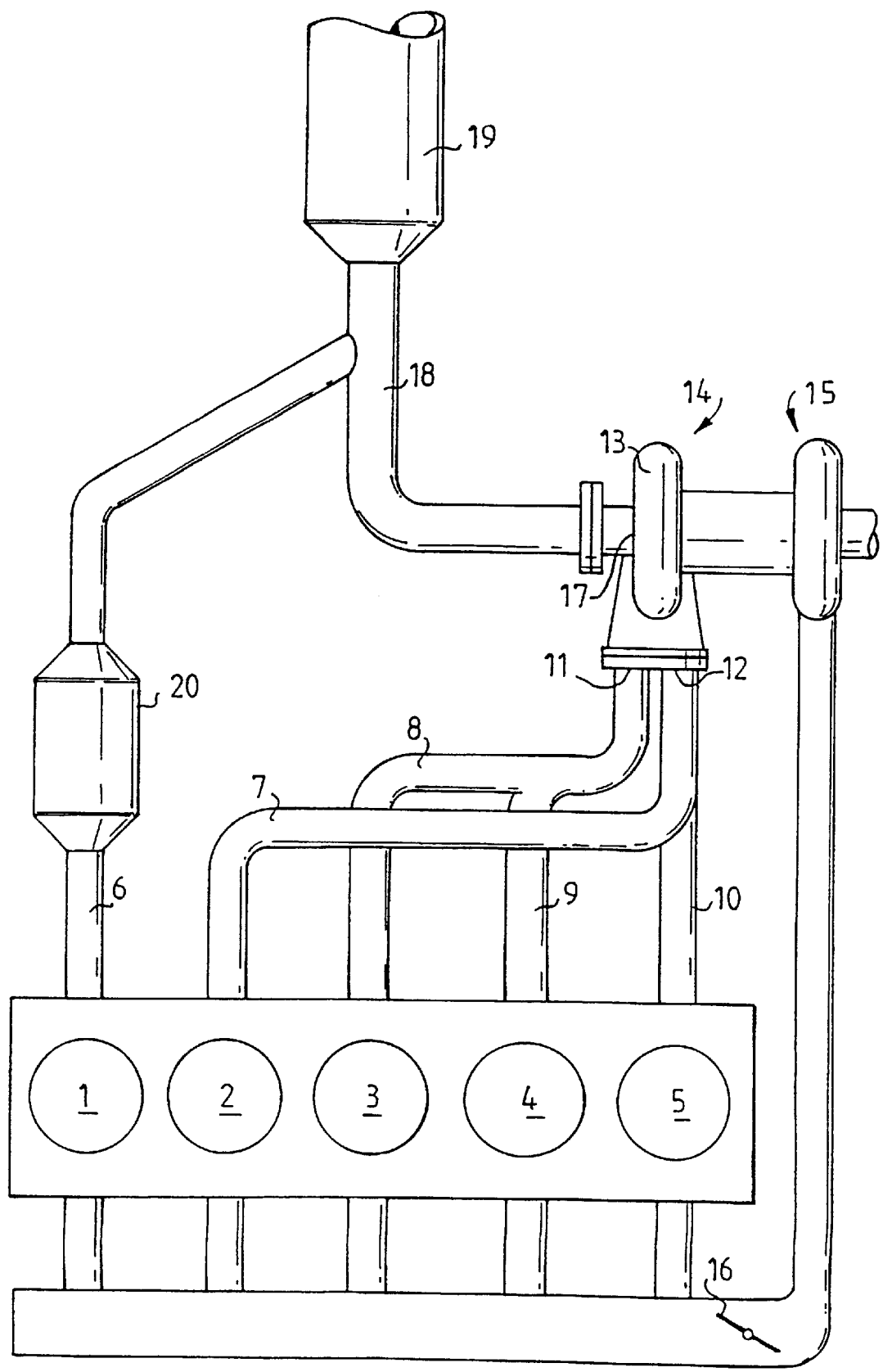

TURBO-CHARGED INTERNAL COMBUSTION ENGINE

The present invention relates to a five-cylinder turbo-charged internal combustion engine with an exhaust manifold connected to a turbine housing, said manifold comprising five exhaust manifold conduits, of which four are combined in pairs and open into an inlet into the turbine housing.

U.S. Pat. No. 4,207,742 reveals as previously known a five-cylinder engine of this type which has a turbine housing with three inlet openings opening into a common inlet channel to the interior of the turbine housing. The pairs of exhaust manifold conduits are each connected to a larger inlet opening, while the fifth exhaust manifold conduit is connected to its own smaller inlet opening. A five-cylinder engine places higher demands on the design of the exhaust manifold than a four-cylinder engine does due to the fact that the overlap between the exhaust valves in the open position is greater than in the four-cylinder engine, and therefore the risk of the cylinders disrupting each other during gas exchange is greater. The described distribution makes possible a form of three-pulse supercharging which limits the disturbing influence of the cylinders on each other during gas exchange.

In the above described known engine, the exhaust manifold conduit of the one outer cylinder is directly connected to the turbine housing. The exhaust manifold conduit from the next cylinder flows together with the exhaust manifold conduit of the second outer cylinder, and the two exhaust manifold conduits of the two remaining cylinders are combined with each other. This means that if we disregard the cylinder with the separate exhaust manifold conduit, the exhaust manifold conduits from the other four cylinders are grouped in the same manner as is common in a four-cylinder engine, i.e. the exhaust manifold conduits from the outer cylinders flow together, as do the exhaust manifold conduits from the middle cylinders.

One purpose of the purpose invention is in general, starting from the above design, to achieve increased component compatibility between the four-cylinder and the five-cylinder engines. An additional purpose of the invention is to achieve a five. cylinder engine of the type described by way of introduction, which has a basic design which makes possible both true pressure-wave super-charging and lower emissions at start.

This is achieved according to the invention by virtue of the fact that the fifth exhaust manifold conduit is drawn past the turbine housing and opens into an exhaust pipe on the downstream side of the turbine housing.

The invention is based on the insight that the disadvantage of not utilizing the energy from the fifth cylinder to drive the turbine is less than the other advantages which can be achieved, for example, the elimination of pressure-waves from the fifth cylinder which can disturb other cylinders. A result will be that an exhaust manifold conduit with associated turbine for a four-cylinder engine can be used without modification on a five-cylinder engine. This, of course, presupposes that the only difference between the four and five-cylinder engine is the number of cylinders.

In order to fully exploit the advantages of allowing only four cylinders to drive the turbine of a five-cylinder engine, there is utilized in a further development of the basic invention an exhaust turbine of so-called twin-entry type, which has a turbine housing with a separate inlet for each of two separate inlet channels to the interior of the turbine housing. By connecting a pair of exhaust manifold conduits to each turbine inlet, true pressure-wave super-charging is achieved in a five-cylinder engine as well, which improves the values for residual gas and degree of filling, especially at low rpm where the response is determined.

It is previously known in the exhaust manifold of a suction engine to arrange an extra so-called start-up catalytic converter which, by virtue of its placement close to the engine cylinders, will be more rapidly warmed up than the ordinary main catalytic converter placed in the exhaust pipe. The extra catalytic converter contributes to more rapid warming-up of the main catalytic converter, and this results in lower emissions at start.

In a preferred embodiment of an engine according to the invention, which, in an exhaust conduit on the downstream side of the turbine housing, has a catalytic exhaust cleaner, the fifth exhaust manifold conduit opens into said exhaust pipe upstream of the exhaust cleaner and contains an additional catalytic exhaust cleaner. A catalytic exhaust cleaner creates a certain exhaust counter-pressure and can therefor not be placed in the exhaust manifold between the engine block and the turbine housing in a turbo engine, but the arrangement with a fifth exhaust manifold conduit drawn past the turbine makes it possible to also utilize a start-up catalytic converter in a turbo engine. The catalytic converter also contributes here to creating an exhaust counter-pressure in balance with the counter-pressure which the turbine generates in the other four exhaust manifold conduits.

The invention will be described in more detail below with reference to an example shown in the accompanying drawing, which shows a schematic representation of an engine according to the invention.

The engine shown in the FIGURE has an engine block with five cylinder 1, 2, 3, 4 and 5, the exhaust blow-out opening into five exhaust manifold conduits 6, 7, 8, 9 and 10, of which the exhaust manifold conduits 7 and 8 combine into a pair, as do the exhaust manifold conduits 9 and 10. The respective exhaust manifold conduit pairs 7, 8 and 9, 10 each open into an individual inlet 11, 12 in the turbine housing 13 of a turbo compressor which has a turbine portion 14 of so-called twin-entry type. The turbine portion 14 drives a compressor portion 15, which feeds inlet air to the inlet manifold 16 of the engine. The turbine housing 13 has an outlet 17, which is connected to an exhaust pipe 18 opening into a catalytic exhaust cleaner 19.

According to the invention, the exhaust blow-out from the first cylinder 1 opens into an exhaust manifold conduit 6, which is drawn past the turbine housing 13 and opens into the exhaust pipe 18 between the turbine housing 13 and the catalytic converter 19. The exhaust manifold conduit 6 contains a start-up catalytic converter 20 which, due to its proximity to the cylinder 1, is rapidly heated and contributes to rapid warming-up of the main catalytic converter 19.

Even if the invention above has been described with reference to one example in which the first cylinder is shunted past the turbine, it is of course easily recognized within the scope of the invention that any cylinder at all can be selected to be shunted past the turbine, depending on suitability for the engine installation in question.

What is claimed is:

1. Five-cylinder turbo-charged internal combustion engine with an exhaust manifold connected to a turbine housing, said manifold comprising five exhaust manifold conduits, of which four are combined in pairs and open into an inlet into the turbine housing, characterized in that a fifth exhaust manifold conduit (6) is drawn past the turbine housing (13) and opens into an exhaust pipe (18) on the downstream side of the turbine housing.

2. Internal combustion engine according to claim 1, characterized in that the turbine housing (13) has a separate inlet (11,12) for each of two separate inlet channels to the interior of the turbine housing and that one pair of exhaust manifold conduits (7,10 and 8,9) opens into each inlet.

3. Internal combustion engine according to claim 1, characterized in that said exhaust pipe (18) on the downstream side of the turbine housing (13) contains a catalytic exhaust cleaner (19) and that the fifth exhaust manifold conduit (6) opens into said said exhaust pipe (18) upstream of the catalytic exhaust cleaner and contains an additional catalytic exhaust cleaner (20).

4. Internal combustion engine according to claim 1, characterized in that the fifth exhaust manifold conduit (6) is drawn from one (1) of the outer cylinder s of the engine, that the exhaust manifold conduit (8) from the middle cylinder (3) of the engine is combined with the exhaust manifold conduit (9) from one (4) of the cylinders adjacent to the middle cylinder and that the exhaust manifold conduit (10) from the other (5) of the outer cylinders of the engine is combined with the exhaust manifold conduit (7) from the other (2) of the cylinders adjacent to the middle cylinder.

5. Internal combustion engine according to claim 2, characterized in that said exhaust pipe (18) on the downstream side of the turbine housing (13) contains a catalytic exhaust cleaner (19) and that the fifth exhaust: manifold conduit (6) opens into said exhaust pipe (18) upstream of the exhaust cleaner and contains an additional catalytic exhaust cleaner (20).

6. Internal combustion engine according to claim 2, characterized in that the fifth exhaust manifold conduit (6) is drawn from one (1) of the outer cylinders of the engine, that the exhaust manifold conduit (8) from the middle cylinder (3) of the engine is combined with the exhaust manifold conduit (9) from one (4) of the cylinders adjacent to the middle cylinder and that the exhaust manifold conduit (10) from the other (5) of the outer cylinders of the engine is combined with the exhaust manifold conduit (7) from the other (2) of the cylinders adjacent to the middle cylinder.

7. Internal combustion engine according to claim 3, characterized in that the fifth exhaust manifold conduit (6) is drawn from one (1) of the outer cylinders of the engine, that the exhaust manifold conduit (8) from the middle cylinder (3) of the engine is combined with the exhaust manifold conduit (9) from one (4) of the cylinders adjacent to the middle cylinder and that the exhaust manifold conduit (10) from the other (5) of the outer cylinders of the engine is combined with the exhaust manifold conduit (7) from the other (2) of the cylinders adjacent to the middle cylinder.

8. Internal combustion engine according to claim 5, characterized in that the fifth exhaust manifold conduit (6) is drawn from one (1) of the outer cylinders of the engine, that the exhaust manifold conduit (8) from the middle cylinder (3) of the engine is combined with the exhaust manifold conduit (9) from one (4) of the cylinders adjacent to the middle cylinder and that the exhaust manifold conduit (10) from the other (5) of the outer cylinders of the engine is combined with the exhaust manifold conduit (7) from the other (2) of the cylinders adjacent to the middle cylinder.

* * * * *